April 23, 1957  D. C. PETERSON ET AL  2,789,664
PUMPING UNIT FOR CENTRALIZED LUBRICATING SYSTEM
Filed Jan. 11, 1954  3 Sheets-Sheet 1

Inventors
David C. Peterson
Charles F. Raisch
By Ahlberg, Wupper, & Gradolph
Attys.

Inventors
David C. Peterson
Charles F. Raisch

By Ahlberg, Kupper, & Iradolph
Attys.

April 23, 1957   D. C. PETERSON ET AL   2,789,664
PUMPING UNIT FOR CENTRALIZED LUBRICATING SYSTEM
Filed Jan. 11, 1954   3 Sheets-Sheet 3
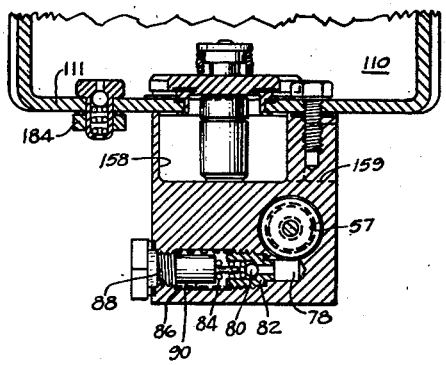
Fig. 4
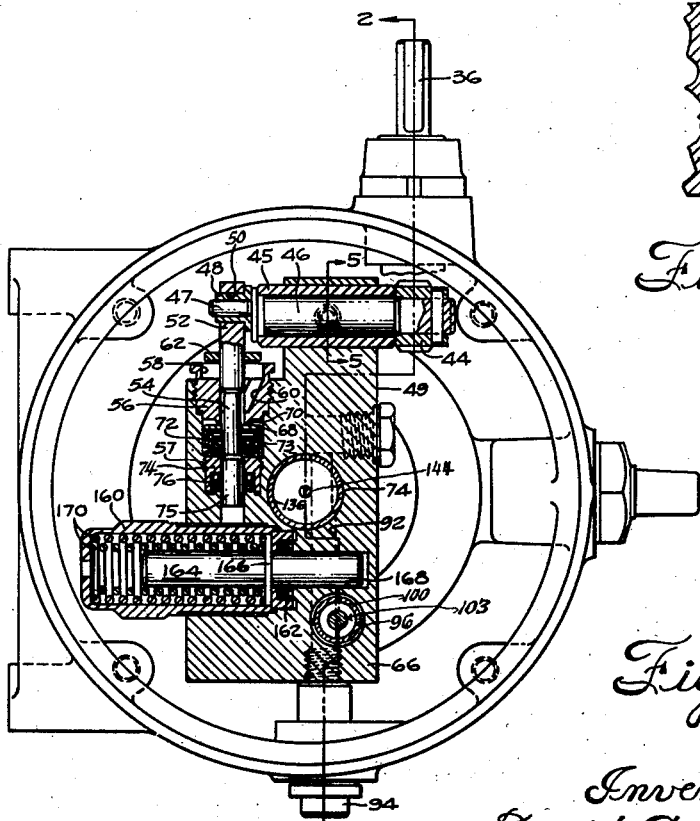
Fig. 5
Fig. 3
Inventors
David C. Peterson
Charles F. Raisch
By
Ahlberg, Kupper & Gradolph
Attys.

United States Patent Office 2,789,664
Patented Apr. 23, 1957

2,789,664

PUMPING UNIT FOR CENTRALIZED LUBRICATING SYSTEM

David C. Peterson and Charles F. Raisch, Chicago, Ill., assignors to Stewart-Warner Corporation, Chicago, Ill., a corporation of Virginia Application January 11, 1954, Serial No. 403,097

9 Claims. (Cl. 184—27)

The present invention relates to pumping mechanisms for centralized lubricating systems, and more particularly to mechanisms for discharging lubricant into such systems at predetermined intervals.

One object of the invention is to provide for and in conjunction with a centralized lubricating system improved lubricant supply means which upon being driven continuously is self-controlled hydraulically to supply to attached lubricating means of the system lubricant under increased pressure directly from a continuously operating pump in quantities limited only by the capacity of the attached lubricating means and at cyclic intervals between applications of increased lubricant pressure from the pump to the attached lubricating means, which are accurately controlled automatically in accordance with the time required for the same pump to pump a definite volume of lubricant predetermined independently of the volumetric capacity of the attached lubricating means.

A more specific object is to provide improved lubricant supply means of the character recited in the previous object in which the intervals between successive applications of lubricant under pressure to the attached lubricating means are hydraulically timed with a reliable accuracy that is not adversely affected by variations in the temperature and viscosity of the lubricant or changes in the overall volumetric capacity of the attached lubricating means.

Other objects will appear from the following description, reference being had to the accompanying drawings, in which:

Fig. 3 is a horizontal sectional view, taken along the irregular line 3—3 of Fig. 2;

Fig. 4 is a fragmentary sectional view, taken on the line 4—4 of Fig. 2; and

Fig. 5 is a fragmentary detail view, taken along the line 5—5 of Fig. 3.

Figure 1:
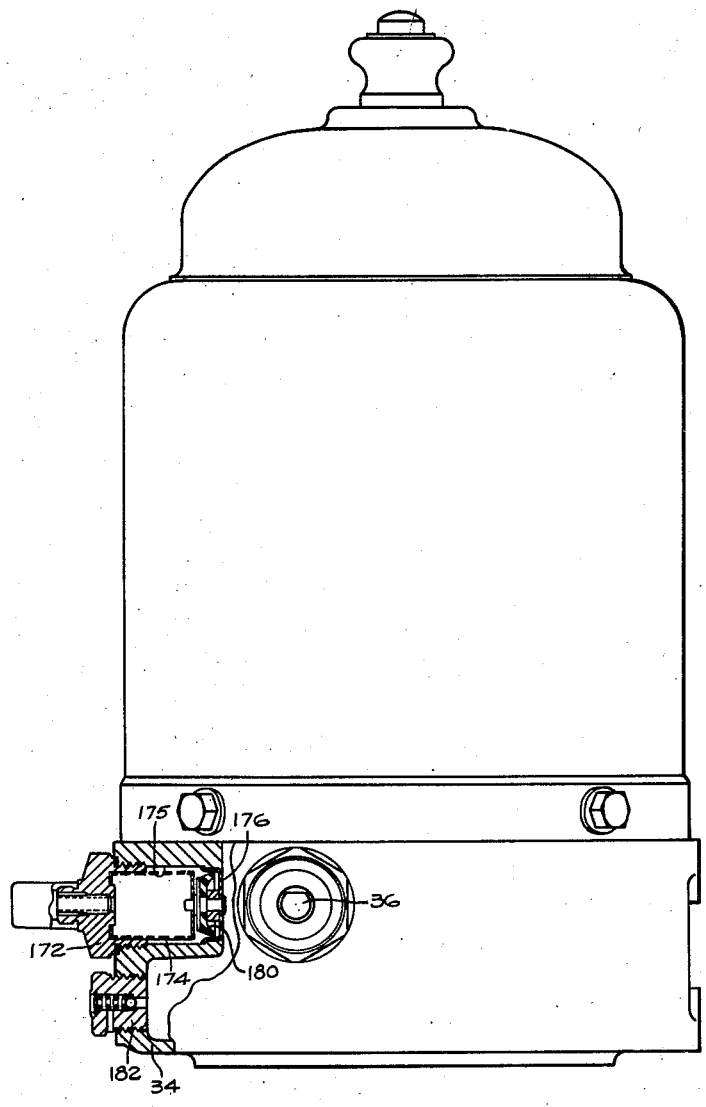
Figure 1 is a side view, partially in section, of a pumping unit embodying the invention.

The pumping apparatus of our invention comprises a reservoir 10 for lubricant, either oil or grease, in which is mounted for reciprocatory movement a follower 12. This follower comprises a synthetic piston cup sealing member 14 clamped between a backing plate 16 and a top plate 18. These plates, generally cup-shaped, are secured together and to a cap 20 attached to a chain 24. The upper end of the chain 24 is secured by a tension spring 26 to an indicator button 28 slidable in a suitable fitting 30 in the top of the reservoir 10.

The button 28 is urged upwardly by a compression coil spring 32 in the fitting 30 to indicate a supply of lubricant in the reservoir. When the follower 12 approaches its lowermost position (Fig. 2), the spring 26, which is stronger than the spring 32, pulls the button inwardly, thus indicating the need for refilling the reservoir. The lower end of the reservoir 10 is secured and sealed to an upwardly open base casting 34.

The pump is driven through a horizontal drive shaft 36 which rotates in a suitable bearing 38 extending through the side wall of the base 34, and having a lubricant seal 40. Although the shaft 36 can be driven continually by a separate motor (not shown), it is preferably connected to a suitable rotary element of the machine to be lubricated (not shown) to start and stop with the machine. A worm gear 42, pinned to the inner end of the drive shaft 36, meshes with a gear 44 fixed to a horizontal shaft 46 journaled in a sleeve 45 held by a pin 43 in a bore in one end of a rectangular block 49 (see Figs. 3 and 5). The block 49 is fastened to the bottom of the base 34 by screws 51. An eccentric pin 47, formed on the end of the shaft 46 opposite from the gear 44, carries a bushing 48 which operates in a vertical slot 50 (Figs. 2 and 3) formed in the outer end of a horizontal pump plunger 52.

The plunger 52 is reciprocable in a cylinder bore 54 formed in a bushing 56 threaded into the outer end of a bore 57 in the block 49. The outer end of the bushing 56 has a short counterbore 58 forming a cup which communicates with the cylinder 54 through a passageway 60. A washer-like member 62, fixed to the plunger 52, pushes the surrounding lubricant into the cup 58 to flow through the passageway 60 into the pump bore 54.

The central portion of the plunger 52 is necked down to a reduced diameter. As the plunger is moved inwardly the lubricant within the bore 54 is forced past a check valve at the inner end of the bore. This valve is formed by a disc 68 encircling the central portion of the plunger 52. The disc is urged against a seat 70 on the inner end of the bushing 56 by a compression coil spring 72. A suitable seal 73 is used between the disc 68 and the plunger 52.

An elongated cylindrical head 75, having a diameter substantially equal to that of the outer end of the plunger 52 is threaded into the inner end of the central necked down section of the plunger. The head 75 is guided in a continuation of the bore 54 which extends into the block 49 through a bushing 74 in the inner end of the bore 57. Leakage of fluid past the plunger head 75 is prevented by a seal 76.

During the outward stroke of the plunger 52, fluid in the bore 57 between the bushing 74 and the valve disc 68 is forced outwardly through a passageway 78 past an outlet check valve 80 (Fig. 4) which is biased against its seat 82 by a spring 84. A fine mesh screen 86 is carried by a suitable fitting 88 threaded in a bore 90.

Figure 2:
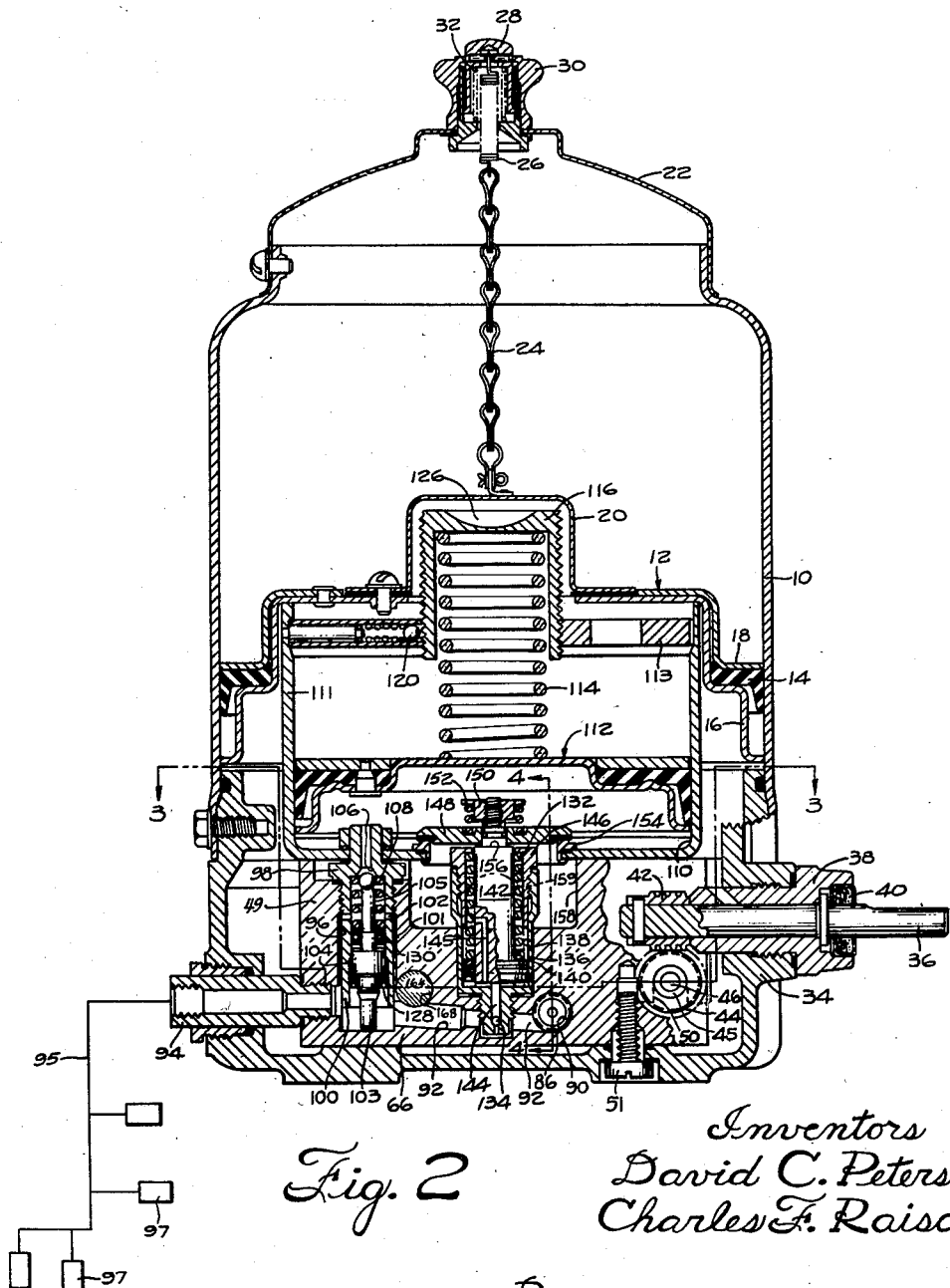
Fig. 2 is a vertical sectional view, taken generally along the irregular line 2—2 of Fig. 3, and diagrammatically illustrating a centralized lubricating system connected to the unit.

As shown in Fig. 2, the lubricant which passes the check valve 80 and through the screen 86, is free to flow into a horizontal passageway 92 which joins the passageway 78 at a right angle.

The passageway 92 communicates with an outlet fitting 94 which is adapted to be connected to the conduit system 95 of a centralized lubricating system (illustrated diagrammatically in Fig. 2) employing measuring or feeder valves 97 adjacent the bearings to be lubricated. These valves may be of the type shown in the application of David C. Peterson and Joseph C. Bystricky, Serial No. 180,048, filed August 17, 1950, now Patent Number 2,742,978.

In systems of this type it is desirable to apply pressure to the line at regular intervals while the machine with which the system is associated is being operated. Such application may be desirable at intervals, for example, from one to four hours.

The block 66 is provided with a vertical bore 96 opening downwardly into the passageway 92. A sleeve-like fitting 98 threaded in the upper end of the bore 96 has a skirt portion 100 spaced somewhat from the wall of the bore 96 to provide space 101 for the flow of lubricant up from the passageway 92 through ports 102 into the upper end of the fitting. A valve plunger 103 reciprocable in the fitting 98 includes a piston portion 104 reciprocable in the skirt and a stem 105 extending upwardly to close a cut-off valve orifice 106 in the upper end of the fitting 98. The plunger 103 is biased downwardly toward open position by a spring 108. The lower end of the fitting skirt 100 is bored to a slightly larger diameter than the medial portion of the skirt thus giving the lower end of the plunger piston 104 and its seal a larger effective face area than the upper end of the piston and its seal.

An accumulator cylinder 110 is formed by a bowl shaped member 111 secured to the topside of the block 49 and covered by a disc 113 secured to the upper end of the member 111. A free floating piston 112 reciprocable within the accumulator cylinder 110 is urged downwardly by a compressed coil spring 114. The upper end of the spring 114 bears in an adjusting cup member 116 threaded in the disc 113 and held in adjusted position by a spring pressed ball detent 120 mounted in the disc.

The cup member 116 is provided with a kerf 126 for the reception of a screwdriver or other suitable tool when the position of the cup member is to be changed. The lower end of the cup member 116 forms an abutment which limits the upward movement of the piston 112 thus determining the capacity of the accumulator cylinder 110. As will appear later this determines the time interval between applications of lubricant pressure by the unit.

The spring 114 is not very powerful. Hence, lubricant may be pumped into the accumulator cylinder 110 at a relatively low pressure, let us say 40 or 50 p. s. i. However, when the piston 112 abuts against the lower end of the cup member 116, the pressure builds up in the system and the plunger 103 is forced upwardly to close the orifice 106. Then lubricant is pumped through the outlet fitting 94 into the conduit 95 of an attached lubricating system.

After the lubricant pressure has been built up in the system to a predetermined value, for example 2000 p. s. i., so that it will be assured that all of its measuring valves 97 have been supplied with a charge of lubricant, the lubricant pressure operates to empty the accumulator cylinder 110 back into the reservoir 10. Thus, the pressure of fluid in the passageway 92 overcomes the force of a spring 132 which normally holds a valve ball 134 closed against a valve seat formed in the lower end of a fitting 136, which is suitably formed and threaded into the block 49 to depend down into the passageway 92. This fitting 136 has a bore 138 in which the piston part 140 of a plunger 142 is reciprocable. A small diameter projection 144, D-shaped in cross section, extends downwardly from the plunger 142 to engage the ball valve 134, Figs. 2 and 3.

The plunger 142 is urged downwardly by the spring 132 interposed between the upper side of the piston part 140 and a thimble 146 threaded in the upper end of the fitting 136. Ample clearance is provided between the plunger 142 and the thimble to allow escape of lubricant. An L-shaped passageway 145 extends from the lower end of the large diameter portion of the plunger 142 to a point intermediate its ends. When the valve 134 is opened, a restricted flow of lubricant is bypassed along the flat portion of the projection 144, through the passageway 145, and around the plunger 142 into a recess 158 formed in the block 49 and surrounding the thimble 146. The recess 158 communicates through a bore 159 with the hollow space within the base 34.

A return discharge valve 148 is yieldingly secured to the upper end of the plunger 142. A reduced diameter portion on the upper end of the plunger 142 extends loosely through a central opening in the discharge valve 148 thus providing for a self-locating action of the valve. A spring 152 is compressed between the valve 148 and an overlying nut 150 threaded on the upper end of the plunger 142. The discharge valve 148 is adapted to engage a seat 154 suitably secured in the bottom of the cylinder member 111.

After the pressure within the passageway 92 has been raised to a value sufficient to unseat the valve 134, lubricant flows past this valve into the bottom of the bore 138. There it acts upon the entire lower end of the plunger 142 shifting it to a fully raised position. A shoulder 156 on the upper end of the plunger abuts the lower face of the valve 148 raising it from its seat. Fluid within the accumulator cylinder 110 is then forced out through the space 158 and the bore 159 by the spring 114 and piston 112.

To prevent the valve 148 from reclosing before the piston 112 reaches the lower end of its stroke, means are provided to maintain a substantial pressure in the passageway 92 for a substantial interval of time. This means comprises a pressure bell formed in part by a fitting 160 (Fig. 3) threaded into the block 49. The inner end of the fitting clamps a sealing gasket and support 162 around a reciprocable plunger 164 which has an annular projection 166 around it secured thereto or integral therewith. The inner end of the plunger is guided in a bore 168 formed in the block 49 and intersecting the passageway 92. There is sufficient clearance between this end of the plunger and the bore that lubricant may flow from the passageway 92 to the inner end of the bore 168.

Thus, as the pressure is being built up in the conduit system, lubricant acting on the inner end of the plunger 164 forces the latter outwardly against the force of a pair of compressed coil springs 170 interposed between the projection 166 and the outer end of the fitting 160. The pressure maintaining receiver formed by the bore 168 and the plunger thus serves the required purpose of maintaining pressure in the passage 92 for a sufficient length of time to permit emptying of the accumulator cylinder. Also, the pressure maintained in the passageway 92 keeps the orifice 106 closed while the accumulator 112 is emptying.

As soon as the ball valve 134 opens, lubricant can return back through the outlet fitting 94, the passageway 92, the check valve 134, through passageway 145, and the recess 158 to the reservoir.

It will be understood that there is a certain degree of flexibility in the conduit system of the associated lubricating system which tends to retain lubricant under pressure. This pressure is relieved in the manner just recited.

The reservoir 10 is filled through a suitable inlet fitting 172 which may be coupled to a grease gun. From this fitting the lubricant passes through a cylindrical strainer 174 disposed in a bore 175 in the base 34. A spider 176 pressed in the inner end of the bore 175 carries a flexible check valve 180. The peripheral flange of the check valve 180 is cupped inwardly and normally engages the cylindrical portion of the bore 175. When the inlet fitting and the strainer are removed for cleaning, the lubricant is retained in the reservoir by the valve.

To prevent the development of excessive pressure within the reservoir during a filling operation a safety valve 182 is threaded in the reservoir base 34. Similarly, to prevent the development of excessive pressure within the accumulator chamber 110, a safety valve 184 is suitably secured in the base of the member 111 (see Fig. 4).

The self-contained unit thus formed is capable of discharging lubricant under high pressure into a centralized lubricating system at regular predetermined intervals when the lubricant pump of the unit is driven continuously.

A review of the operation of the unit may start with the assumption that the pump drive shaft 36 is being continuously driven and that the accumulator cylinder 110 is empty. Lubricant from the reservoir 10 flows into the pump cylinder bore 54, aided by the feeding action of the washer 62 on the pump plunger 52. The plunger 52 pumps the fluid past the intermediate check valve surrounding the central portion of the plunger into the second stage of the pump. From here it is pumped through the outlet valve into the passageway 92. At this time the cut-off valve orifice 106 is open, permitting lubricant to flow from the pump into the accumulator cylinder 110.

The time interval between lubricating cycles is determined roughly by the time required for the high pressure pump to fill the effective capacity of the accumulator cylinder 110. The effective volume of the accumulator and hence the time intervals between lubricating cycles can be regulated by adjusting the vertical position of the threaded abutment 116 which limits upward movement of the accumulator piston 112.

After the accumulator 110 has been filled, the pressure within the passageway 92 is built up by the pump. When this pressure reaches a predetermined value, the differential piston 104 operates to close the orifice 106 of the cut-off valve in the passage leading to the accumulator. This isolates the accumulator from further increases in the pump outlet pressure.

The increased fluid pressure from the pump causes lubricant to flow out through the fitting 94 into the measuring valves 97 of an attached lubricating system. This continues until all the measuring valves are filled and the pressure is built up to a second and much higher value of the order of 2000 pounds per square inch to assure that filling of the measuring valves is complete.

During this phase of the lubricating cycle the receiver formed by the bore 168 and the plunger 164 is filled with high pressure fluid compressing the receiver spring 170.

The force of fluid at the higher pressure level acting on the small face area of the ball 134 on the lower end of the plunger projection 144 overcomes the force of the spring 132 to open the small orifice leading into the space at the lower end of the plunger 142. Fluid then acts on the larger face area of the plunger 142 to open the accumulator return valve 148 with a snap action, permitting the accumulator to immediately empty through the recess 158 and the return bore 159.

At this time the fluid output from the pump escapes through the bypass 145 extending through the plunger 142 from the space at the lower end of the plunger to passages leading back to the fluid reservoir. The restricted flow of lubricant through the bypass 145 tends to relieve the pressure in the passage 92 from the pump.

The return valve 148 is prevented from reclosing before the accumulator 110 is emptied by the return of lubricant under pressure into the passageway 92 from the receiver bore 168. By the time the reserve of fluid under pressure within the receiver is exhausted the accumulator will have emptied.

The continued escape of fluid through the bypass 145 reduces the pressure within the passageway 92 to a level at which the spring 108 will open the cut-off valve leading to the accumulator cylinder 110. Then the output from the pump will again flow freely into the accumulator to begin a new cycle of operation. The valve ball 134 which closes off the accumulator return valve actuator from the passageway 192 is again seated by the spring 132.

The positive displacement of the fluid pump together with the definite though adjustable volume of the accumulator provides for an accurate timing of the successive lubricating cycles. For the most part, the lubricant pump operates against only a nominal back pressure, except when lubricant is being discharged into an attached lubricating system.

Except for a few pressure responsive control pistons and plungers which generally have only one cycle of operation for each lubricating cycle, the working parts of the unit are limited to the very simple two-stage pump employed.

Since the timing of the successive lubricating cycles is a function of the volume of lubricant pumped between cycles, the unit may be used successfully with lubricant of widely different viscosities. In this connection it will be noted that the pump feeding action of the washer 62 on the pump plunger 52 assures full capacity operation of the pump even when lubricants of high viscosity are used.

While we have shown and described a preferred embodiment of our invention, it will be apparent that variations and modifications thereof may be made without departing from the principles and scope of the invention. We therefore desire, by the following claims, to include all such variations and modifications by which substantially the results of our invention may be obtained through the use of substantially the same or equivalent means.

We claim:

1. Apparatus for cyclically discharging lubricant into a centralized lubricating system, comprising, in combination, a source of lubricant, a pump mounted to receive lubricant from said source, discharge means connected to the outlet of said pump, an accumulator connected with said pump outlet, a cut-off valve interposed between said pump outlet and said accumulator, means for closing said valve when the pump outlet pressure reaches a predetermined value, a return valve for said accumulator, and means for opening said return valve after said accumulator has been filled to capacity.

2. Apparatus for cyclically supplying lubricant under pressure to a centralized lubricating system or the like, comprising, in combination, a source of lubricant, a pump mounted to receive lubricant from said source, discharge means connected to the pump outlet, an accumulator connected with said pump outlet, a normally open cut-off valve interposed between said pump and said accumulator, a pressure responsive actuator for said cut-off valve communicating with said pump outlet to close said valve when the back pressure on said pump reaches a first predetermined level, a normally closed return valve for emptying said accumulator, and a pressure responsive return valve actuator communicating with said pump outlet to open said return valve when the back pressure of said pump reaches a second and higher predetermined value.

3. Apparatus for cyclically discharging lubricant under pressure into a centralized lubricating system or the like, comprising, in combination, a source of lubricant, a pump adapted for continuous operation and mounted to receive lubricant from said source, discharge means connected to the outlet of said pump, a cylinder and piston forming an accumulator connected to receive fluid from said pump outlet, an adjustable abutment coacting with said piston to vary the effective volume of said accumulator, a cut-off valve interposed between said pump outlet and said accumulator, means for closing said cut-off valve when the pump outlet pressure reaches a predetermined value, a return valve for emptying said accumulator, and means for opening said valve after said accumulator has been filled to capacity.

4. Apparatus for cyclically discharging fluid under pressure into a centralized lubricating system or the like, comprising, in combination, a source of lubricant, a pump mounted to receive lubricant from said source, discharge means connected to the outlet of said pump, an accumulator connected to receive lubricant from said pump outlet, a cut-off valve interposed between said accumulator and said pump, a piston actuator for said cut-off valve having differential pressure areas exposed to the outlet pressure of said pump, said piston serving to close said cut-off valve when said outlet pressure reaches a predetermined value, a return valve for emptying said accumulator, and an actuator for opening said return valve after said accumualtor has been filled to capacity.

5. Means for cyclically discharging fluid under pressure into a centralized lubricating system or the like, comprising, in combination, a source of lubricant, a pump connected to receive lubricant from said source, lubricant discharging means connected with the outlet of said pump, an accumulator connected with said pump outlet, a cut-off valve interposed between said pump outlet and said accumulator, a fluid pressure responsive actuator for said cut-off valve connected to be exposed to the outlet pressure of said pump to close said cut-off valve when said outlet pressure reaches a first predetermined value, a return valve for emptying said accumulator, a fluid pressure responsive actuator for said return valve communicating with said pump outlet to open the return valve when the pump outlet pressure reaches a second predetermined value, means forming a normally closed bypass of restricted flow area from said pump outlet to said lubricant source, and means associated with said return valve actuator for opening said bypass as an incident to operation of said return valve actuator to open said return valve.

6. Apparatus for cyclically discharging fluid under pressure into a centralized lubricating system or the like, comprising, in combination, a source of fluid, a pump connected to receive fluid from said source, discharge means connected to the outlet of said pump, an accumulator connected with said pump outlet, a cut-off valve interposed between said accumulator and said pump outlet, a fluid presure responsive actuator for said valve communicating with said pump outlet to close said valve when the pump outlet pressure reaches a first predetermined value, a return valve for emptying said accumulator, a fluid pressure responsive actuator for said return valve communicating with said pump outlet to open the return valve when the pump outlet pressure reaches a second and higher predetermined value, an expandable receiver connected with said pump outlet to receive fluid therefrom under pressure, and strong spring means mounted to compress said receiver to force fluid back out of the receiver to maintain an elevated pressure level at the pump outlet after said return valve actuator has operated to open the return valve.

7. A unit for intermittently supplying lubricant under pressure to a centralized lubricating system, comprising, in combination, a reservoir for lubricant, a pump adapted for continuous operation and connected to receive lubricant from said reservoir, discharge means connected to the outlet of said pump, an accumulator connected with said pump outlet, a cut-off valve interposed between said accumulator and said pump outlet, a piston actuator for said cut-off valve having differential pressure areas exposed to the outlet pressure of said pump to close said cut-off valve when said outlet pressure reaches a first predetermined value, a return valve interposed between said accumulator and said reservoir, a piston actuator for said return valve, means defining an expandable space closed at one side by one end of said piston, means forming a valve orifice between said pump outlet and said space, means on said return valve piston for closing said orifice and having a relatively small pressure area, spring means mounted to bias said return valve piston in a direction for closing said return valve and said valve orifice, means forming a bypass running through said return valve piston from said space, an expandable receiver communicating with the downstream side of said pump, and strong spring means for compressing said receiver to expel lubricant therefrom back to the downstream side of said pump to maintain a substantial pressure thereon after said return valve piston has operated to empty said accumulator.

8. A unit for cyclically discharging lubricant under pressure into a centralized lubricating system or the like, comprising, in combination, a reservoir for lubricant, a lubricant pump including a reciprocable plunger, means forming a cup at the pump inlet, a feeding member mounted on said pump plunger for coaction with said cup to feed lubricant from said reservoir into the pump inlet, discharge means connected with the outlet of said pump, an accumulator connected with said pump outlet, a cut-off valve interposed between said pump outlet and said accumulator, means for closing said valve when the pump outlet pressure reaches a predetermined value, a return valve for emptying said accumulator, and a pressure responsive actuator for said return valve communicating with said pump outlet to empty said accumulator when the back pressure on said pump reaches a predetermined higher value.

9. Apparatus for cyclically discharging lubricant into lubricant feeder means, comprising, in combination, a source of lubricant, a pump connected to receive lubricant from said source and adapted to be driven continuously, means defining an outlet from said pump, an accumulator connected with said pump outlet to receive lubricant therefrom, a normally open cut-off valve interposed between said pump outlet and said accumulator, movable hydraulic actuating means communicating hydraulically with said pump outlet and connected to said cut-off valve for actuation by the force of fluid discharged from said pump upon filling of said accumulator to close said cut-off valve, a normally closed return valve connected between said accumulator and said source of lubricant, means for opening said return valve after said accumulator has been filled to capacity, and lubricant discharge means communicating with said pump outlet at the upstream side of both of said cut-off valve and said return valve and adapted for connection with lubricant feeder means.

References Cited in the file of this patent

UNITED STATES PATENTS

| | | |
|---|---|---|
| 1,934,053 | Gleason | Nov. 7, 1933 |
| 1,979,370 | Davis | Nov. 6, 1934 |
| 2,048,003 | Hawks | July 21, 1936 |
| 2,219,681 | Davis | Oct. 29, 1940 |
| 2,597,137 | Tear | May 20, 1952 |